June 23, 1931.　　　D. E. OLSHEVSKY　　　1,811,364
WIND TUNNEL FOR TESTING AEROPLANES
Filed June 7, 1930　　　2 Sheets-Sheet 2

Patented June 23, 1931

1,811,364

UNITED STATES PATENT OFFICE

DIMITRY E. OLSHEVSKY, OF MILFORD, CONNECTICUT

WIND TUNNEL FOR TESTING AEROPLANES

Application filed June 7, 1930. Serial No. 459,781.

My invention relates to a wind tunnel for testing aeroplanes, and more especially to a wind tunnel in which a model aeroplane built to scale may be suspended for the purpose of studying its flying characteristics.

The usual wind tunnel comprises a horizontal conical tube in which a model aeroplane built to scale is suitably suspended and balanced, there being means for directing a flow of air through the tunnel at a variable velocity in order to determine the characteristics of the full size aeroplane of which the model is built to scale.

It is in general, an object of the present invention to bring about an improved form of wind tunnel in which the flying characteristics of aeroplanes may be determined with greater preciseness than has heretofore been possible.

In a more specific aspect, it is an object of the invention to bring about a wind tunnel having a flow of air directed perpendicularly to the horizontal as against the usual horizontally directed stream, the direction of the air stream in the improved tunnel coinciding with the direction of the pull of gravity on the model aeroplane.

A further object of the invention is to provide a wind tunnel in which the air flows in a substantially closed circuit, thus producing greater efficiency and uniformity of flow than is possible in the usual open-ended type of tunnel.

A still further object of the invention is to provide a wind tunnel having the above characteristics in which the model aeroplane may be readily observed and the flying characteristics thereof measured.

To these and other ends, the invention consists in the novel features and combinations of parts to be hereinafter described and claimed.

Figure 1:
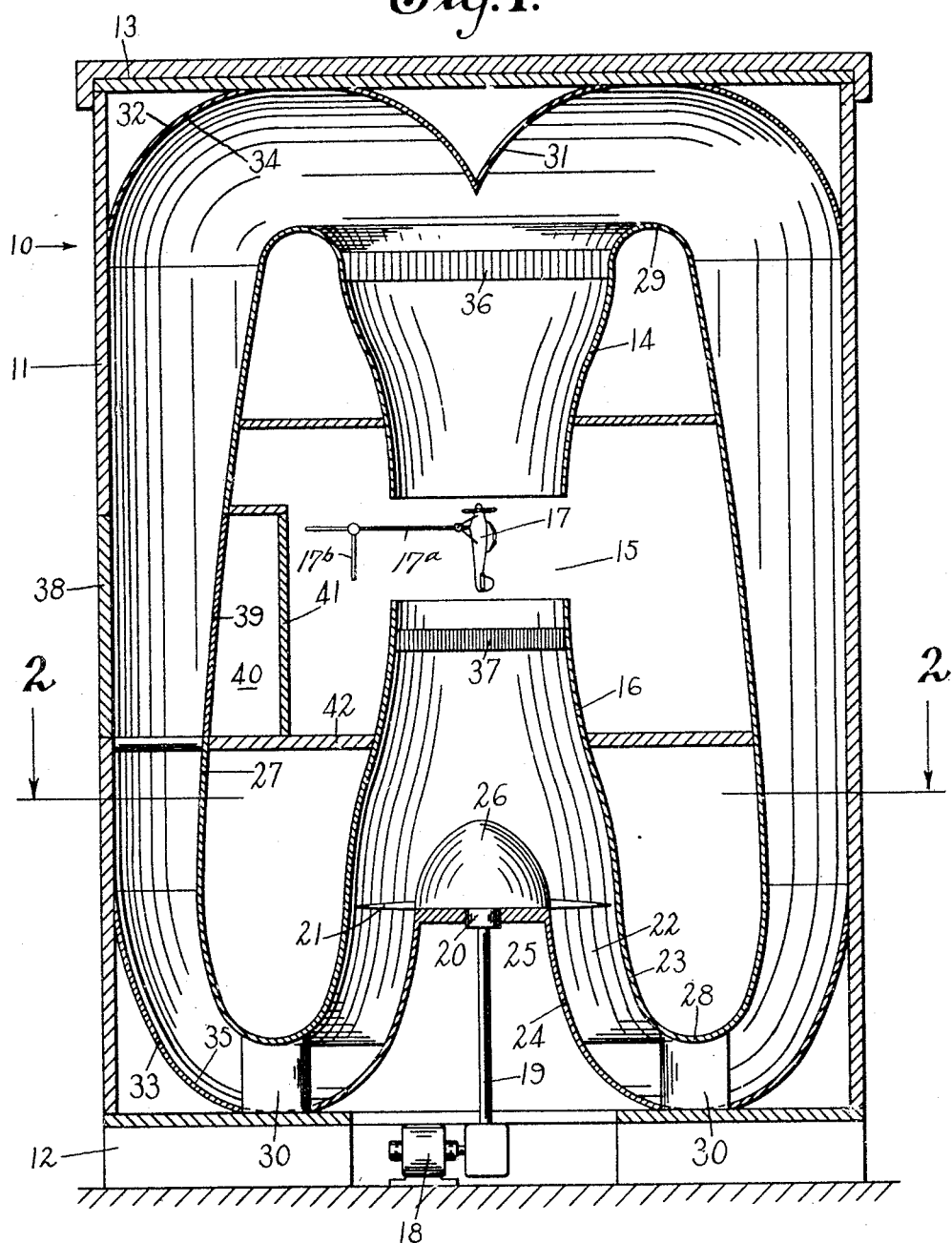
Fig. 1 shows a vertical section of a wind tunnel according to my invention.

Referring now to the drawings in which I have illustrated my invention by showing a preferred embodiment of the same, the reference numeral 10 indicates in general the improved wind tunnel, which comprises a generally vertical cylindrical imperforate housing or frame 11, supported on a suitable base 12 and terminating at its upper end in a cap 13. Mounted within frame 11, near the upper end thereof, is a downwardly directed accelerating throat 14, separated by a gap 15 from de-accelerating throat 16, throats 14 and 16 tapering towards one another and gap 15 providing for the ready suspension of the model aeroplane 17 in the stream of air which passes from throat 14 to throat 16, the model being supported by any suitable measuring device by means of a rod or bar $17^a$ on a universal support shown diagrammatically at $17^b$.

Within base 12 is an electric motor or other power device 18, which is connected by means of suitable gearing (not shown) to a vertical shaft 19, on the upper end of which within the lower end of throat 16 is an impeller 20, having blades 21 which, upon rotation of impeller 20 by means of motor 18, exhaust air from throat 16 and force it into the annular passage 22 formed between the lower end 23 of throat 16 and the outer surface of truncated cone 24, the upper end 25 of which serves to support the impeller 20, the latter being provided with a conical hub 26, serving to direct the air stream flowing through throat 16 against the blades 21 of the impeller.

Figure 2:
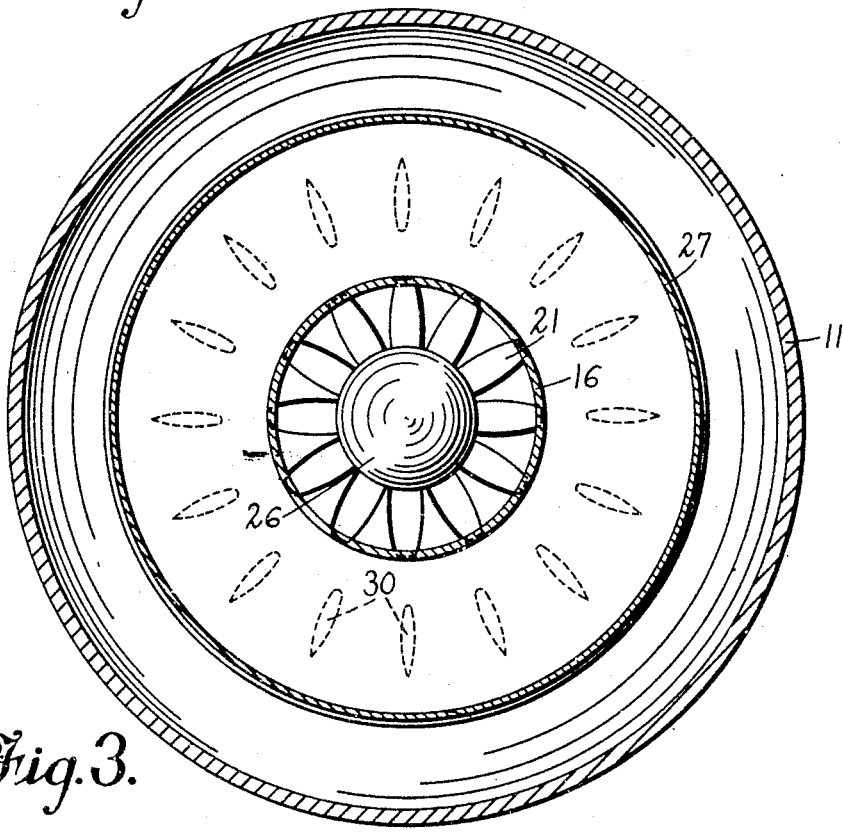
Fig. 2 is a cross-sectional view along line 2—2 of Fig. 1.

Spaced inwardly from and concentric to the housing 11 and surrounding throats 14 and 16, is a hollow cylindrical shell 27, connected at its lower end to throat 16 by means of semi-torus shaped part 28, shell 27 tapering inwardly towards its upper end and being connected to throat 14 by means of semi-torus shaped part 29. In the present instance, the cylindrical shell 27 and throats 14 and 16 are shown as formed of one piece and may be of laminated material, if desired, in the usual manner, the cylindrical shell and throats being supported by a number of struts 30 which are stream-lined as indicated in Fig. 2, to facilitate the passage of the air stream.

Mounted on cap 13 above throat 14 is a downwardly directed conical deflector 31, which serves to direct the stream of air flowing between housing 11 and shell 27 into the upper enlarged end of throat 14. At the upper and lower ends of housing 11 are fillets 32 and 33 having curved inner surfaces 34 and 35 which connect the surfaces of cones 24 and 31 to the inner surface of housing 11.

It will be readily understood that rotation of impeller 20 by means of motor 18 will produce a flow of air downwardly through throat 16, the air passing upwardly between housing 11 and shell 27 and being directed downwardly through throat 14, thence around aeroplane model 17 and into throat 16. It will thus be seen that a completely enclosed circuit for the air is provided, in which there is no opportunity for interference by other streams of air flowing without the wind tunnel. In order to restrict the flow of air in throats 14 and 16 to rectilinear motion honeycomb vanes 36 and 37 are provided in throats 14 and 16, these being of any usual construction and not being shown herein in detail.

In order that the action of the stream of air on aeroplane 17 may be readily observed and measured, the housing 11 is provided with a door 38 opposite which, in shell 27, is a door 39 by means of which the observer may enter the interior of a tunnel. In certain instances it may be desirable to provide a chamber 40 between door 39 and the interior of the tunnel, the chamber 40 being provided with a door 41 opposite door 39. The reference numeral 42 indicates a platform on which the observer may stand, the platform also serving to support the throat 16 against movement.

Figure 3:
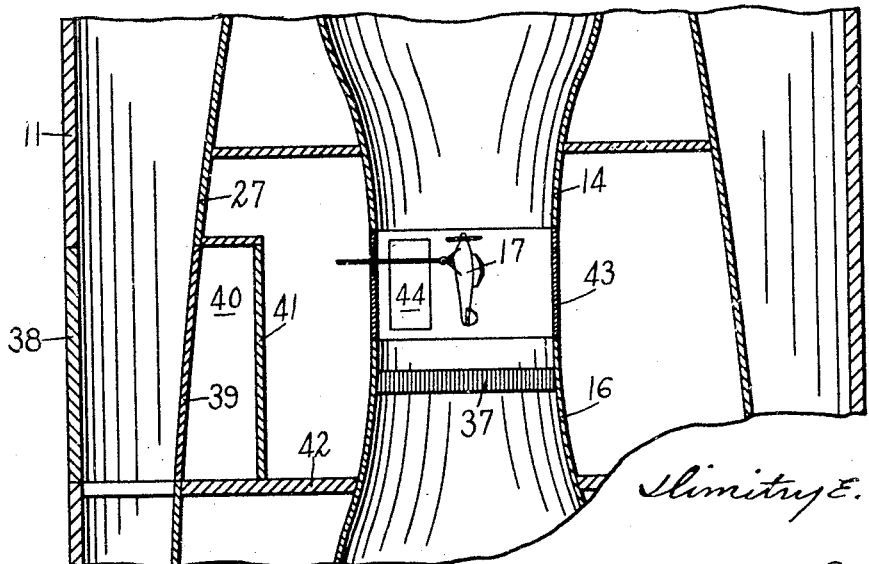
Fig. 3 is a view similar to Fig. 1 but broken away and showing a modification of the invention.

In the form of the invention shown in Fig. 3, the gap 15 is closed by a cylindrical shell 43 connecting the adjacent ends of the throats and preventing the formation of eddy currents in and around the ends of the throats, the support for the aeroplane 17 extending through cylinder 43, the latter being provided with a door 44 by means of which the interior of the shell 43 and aeroplane 17 become readily accessible. Preferably the shell 43 is made of transparent material so that the aeroplane 17 may be observed without the necessity of opening the door 44.

While in the form shown the fan or impeller is described or illustrated as inducing a downward draft of air, it will be understood that the direction of the air current may be reversed without modification of the tunnel construction, and in such case, the air stream being directed upwardly, free models may be tested in the tunnel.

From the above description of the invention it will be readily understood that air is withdrawn from throat 16 by means of impeller 21, passes downwardly between the walls of throat 16 and the cone 24, thence upwardly between the walls of housing 11 and shell 39, and downwardly through throat 14, around plane 17 and into throat 16. The throats are surrounded by the passageway formed between housing 11 and shell 39, the cross-sectional area of the passageway increasing from the lower end of the throat 16 towards the throat 14, the air having its highest velocity adjacent the aeroplane 17.

While I have shown and described a preferred embodiment of my invention, it will be understood that it is not to be limited to all of the details shown, but is capable of modification and variation within the spirit of the invention and within the scope of the appended claims.

What I claim is:

1. In a wind tunnel, a pair of throats mounted one above the other and having a gap therebetween in which an aeroplane may be suspended, and means for causing the passage of air from one of said throats to the other.

2. In a wind tunnel, a pair of throats mounted one above the other and having a gap therebetween in which an aeroplane may be suspended, and means for causing the passage of air from the upper throat into the lower throat.

3. In a wind tunnel, a pair of vertically aligned throats separated by a gap in which an aeroplane may be suspended, a fan within one of said throats for creating a draft of air across said gap, and an air passage connecting the remote ends of said throats.

4. In a wind tunnel, a pair of vertically aligned throats separated by a gap in which an aeroplane may be suspended, a rotary fan in the lower end of the lower throat and a passageway for air connecting the remote ends of said throats.

5. In a wind tunnel, a pair of vertically aligned throats having their adjacent ends separated by a gap in which an aeroplane may be suspended, a passageway for air surrounding said throats and connecting the remote ends thereof, and means for creating a flow of air through said throats and said passageway.

6. In a wind tunnel, a pair of vertically aligned throats having their adjacent ends separated by a gap in which an aeroplane may be suspended, a passageway for air surrounding said throats and connecting the remote ends thereof, and a fan within one of said throats for creating a flow of air through said throats and through said passageway.

7. In a wind tunnel, a pair of vertically aligned throats having their adjacent ends separated by a gap in which an aeroplane may be suspended, a passageway for air surrounding said throats and connected to the remote ends thereof, and a fan in the lower end of the lower throat for creating a flow of air through said passageway and through said throats.

8. In a wind tunnel, a closed system substantially circular in cross-section in which air may be circulated, and means for suspending a model to be tested in the stream of air circulating in said system.

9. In a wind tunnel, means for suspending an aeroplane with its axis in a vertical position, and means for creating a downward draft of air around the aeroplane.

10. In a wind tunnel, means providing a substantially vertical air passage for the reception of an aeroplane model, means for inducing a current of air through said passage, and means providing a return passage for the induced air from the outlet end to the inlet end of said vertical passage.

11. In a wind tunnel, means providing a substantially vertical air passage for the reception of an aeroplane model, means for inducing a current of air through said passage, and means providing a return passage for the induced air from the outlet end to the inlet end of said vertical passage, said return passage being annular in cross-sectional shape, and said vertical passage being located within the return passage.

12. A wind tunnel for aeroplanes comprising a substantially vertical air passage for the reception of a model aeroplane, means for inducing a current of air through said passage, means providing return passage for the air from the outlet to the inlet of said vertical passage, said return passage surrounding the vertical passage on all sides and being of annular shape in cross-section.

13. In a wind tunnel, means providing a substantially vertical air passage for the reception of a model to be tested, and means for inducing a current of air through said passage whereby a free model may be tested therein.

14. A wind tunnel comprising an outer passage annular in shape in cross-section, and an inner passage located substantially centrally of said outer passage, said inner passage being connected at its ends to the outer passage, the longitudinal axes of said passages being directed vertically, and means adjacent one end of the inner passage for inducing a draft of air therethrough.

In witness whereof, I have hereunto set my hand this 5th day of June, 1930.

DIMITRY E. OLSHEVSKY.